United States Patent
Lee et al.

(10) Patent No.: US 9,673,495 B2
(45) Date of Patent: Jun. 6, 2017

(54) BATTERY MODULE ASSEMBLY HAVING COOLANT FLOW CHANNEL

(71) Applicant: LG CHEM, LTD., Seoul (KR)

(72) Inventors: Bum Hyun Lee, Daejeon (KR); Jin-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/894,405

(22) PCT Filed: Jul. 28, 2014

(86) PCT No.: PCT/KR2014/006888
§ 371 (c)(1),
(2) Date: Nov. 27, 2015

(87) PCT Pub. No.: WO2015/016557
PCT Pub. Date: Feb. 5, 2015

(65) Prior Publication Data
US 2016/0133999 A1    May 12, 2016

(30) Foreign Application Priority Data
Jul. 31, 2013    (KR) .......................... 10-2013-0090788

(51) Int. Cl.
*H01M 2/10*     (2006.01)
*H01M 10/613*   (2014.01)
(Continued)

(52) U.S. Cl.
CPC ..... *H01M 10/6557* (2015.04); *H01M 2/1077* (2013.01); *H01M 2/206* (2013.01);
(Continued)

(58) Field of Classification Search
CPC ......... H01M 10/6557; H01M 10/6567; H01M 2/206; H01M 10/652; H01M 10/6563;
(Continued)

(56) References Cited

U.S. PATENT DOCUMENTS

| 6,613,472 B1 | 9/2003 | Watanabe |
| 2005/0100783 A1 | 5/2005 | Ro et al. |

(Continued)

FOREIGN PATENT DOCUMENTS

| CN | 102074749 A | 5/2011 |
| JP | 2006-278140 A | 3/2001 |

(Continued)

OTHER PUBLICATIONS

International Search Report issued in PCT/KR2014/006888, mailed on Nov. 5, 2014.

*Primary Examiner* — Stewart Fraser
(74) *Attorney, Agent, or Firm* — Birch, Stewart, Kolasch & Birch, LLP (57) ABSTRACT

Disclosed herein is a battery module assembly including unit modules, each of which includes unit cells mounted to a cartridge in a state of being electrically connected to each other via bus bars, the battery module assembly including two or more sub-modules, each of which includes two or more unit modules vertically stacked from a ground to form a coolant flow channel at an interface therebetween, the unit modules being arranged in a lateral direction in a state of being spaced apart from each other to provide the coolant flow channel, and a module case, in which the sub-modules are received and fixed, the module case having a coolant inlet port, through which a coolant is introduced into the module case, and a cool outlet port, through which the coolant is discharged out of the module case, wherein the coolant flow channel is configured to have a structure in which a vertical sectional area of the coolant flow channel decreases toward the coolant outlet port.

16 Claims, 5 Drawing Sheets

(51) Int. Cl.
*H01M 10/6557* (2014.01)
*H01M 10/625* (2014.01)
*H01M 2/20* (2006.01)
*H01M 10/6563* (2014.01)
*H01M 10/652* (2014.01)
*H01M 10/6567* (2014.01)

(52) U.S. Cl.
CPC ....... *H01M 10/613* (2015.04); *H01M 10/625* (2015.04); *H01M 10/652* (2015.04); *H01M 10/6563* (2015.04); *H01M 10/6567* (2015.04)

(58) Field of Classification Search
CPC . H01M 10/625; H01M 10/613; H01M 2/1077
See application file for complete search history.

(56) References Cited

U.S. PATENT DOCUMENTS

| | | |
|---|---|---|
| 2006/0162149 A1 | 7/2006 | Ha et al. |
| 2007/0020516 A1 | 1/2007 | Yoon |
| 2008/0026284 A1 | 1/2008 | Fujii |
| 2010/0136420 A1 | 6/2010 | Shin et al. |
| 2011/0206948 A1* | 8/2011 | Asai ............... H01M 2/0473 429/7 |
| 2012/0183822 A1* | 7/2012 | Chung .............. H01M 2/1072 429/72 |
| 2013/0071719 A1 | 3/2013 | Chung et al. |
| 2013/0078489 A1 | 3/2013 | Kato et al. |
| 2013/0309532 A1 | 11/2013 | Chung et al. |
| 2013/0344358 A1 | 12/2013 | Colibert et al. |
| 2014/0087221 A1 | 3/2014 | Kim et al. |
| 2014/0178721 A1 | 6/2014 | Chung et al. |

FOREIGN PATENT DOCUMENTS

| | | |
|---|---|---|
| JP | 2005-222699 A | 8/2005 |
| JP | 2007-506242 A | 3/2007 |
| JP | 2008-34297 A | 2/2008 |
| JP | 2008-524797 A | 7/2008 |
| JP | 2008-544441 A | 12/2008 |
| JP | 2010-504622 A | 2/2010 |
| JP | 4592469 B2 | 12/2010 |
| JP | 2013-502688 A | 1/2013 |
| JP | 2013-67335 A | 4/2013 |
| JP | 2014-502003 A | 1/2014 |
| JP | 2014-525114 A | 9/2014 |
| JP | 2014-530459 A | 11/2014 |
| KR | 10-2011-0019490 A | 2/2011 |
| KR | 10-2011-0114454 A | 10/2011 |
| KR | 10-2012-0017613 A | 2/2012 |
| KR | 10-2012-0055156 A | 5/2012 |
| KR | 10-2013-0035192 A | 4/2013 |
| KR | 10-2013-0084722 A | 7/2013 |
| WO | 01/17065 A1 | 3/2001 |
| WO | WO 2012/045978 A2 | 4/2012 |
| WO | WO 2013/682507 A2 | 1/2013 |
| WO | WO 2013/048060 A2 | 4/2013 |

\* cited by examiner

BATTERY MODULE ASSEMBLY HAVING COOLANT FLOW CHANNEL

TECHNICAL FIELD

The present invention relates to a battery module assembly having a coolant flow channel, and more particularly to a battery module assembly including unit modules, each of which includes unit cells mounted to a cartridge in a state of being electrically connected to each other via bus bars, the battery module assembly including two or more sub-modules, each of which includes two or more unit modules vertically stacked from a ground to form a coolant flow channel at an interface therebetween, the unit modules being arranged in a lateral direction in a state of being spaced apart from each other to provide the coolant flow channel, and a module case, in which the sub-modules are received and fixed, the module case having a coolant inlet port, through which a coolant is introduced into the module case, and a cool outlet port, through which the coolant is discharged out of the module case, wherein the coolant flow channel is configured to have a structure in which a vertical sectional area of the coolant flow channel decreases toward the coolant outlet port.

BACKGROUND ART

Secondary batteries have attracted considerable attention as an energy source for electric vehicles, hybrid electric vehicles, etc., which have been developed to solve problems, such as air pollution, caused by existing gasoline and diesel vehicles using fossil fuels.

In addition, technology related to power storage apparatuses that store electric power and stably supplies the stored electric power to a power system when needed has been developed. The power storage apparatuses are apparatuses that store electric power when power demand is low and supply the stored electric power in case of overload or emergency. The power storage apparatuses provide the effect of improving quality of electric power and energy efficiency. In particular, a market for household power storage apparatuses and middle-sized industrial or commercial power storage apparatuses has been rapidly expanding as the power storage apparatuses are related to smart grid technology.

As a result, kinds of applications using the secondary batteries are being increased owing to advantages of the secondary batteries, and hereafter the secondary batteries are expected to be applied to more applications and products than now.

As applications and products, to which the secondary batteries are applicable, are increased, kinds of batteries are also increased such that the batteries can provide powers and capacities corresponding to the various applications and products. In addition, there is a strong need to reduce the size and weight of the batteries applied to the corresponding applications and products.

For example, small-sized mobile devices, such as mobile phones, personal digital assistants (PDA), digital cameras, and laptop computers, use one or several small-sized, lightweight battery cells for each device according to the reduction in size and weight of the corresponding products. On the other hand, middle or large-sized devices, such as electric vehicles, hybrid electric vehicles, and power storage apparatuses, use a middle or large-sized battery module or battery pack having a plurality of battery cells electrically connected with each other because high output and large capacity are necessary for the middle or large-sized devices. The size and weight of the battery module is directly related to an accommodation space and power of the corresponding middle or large-sized device. For this reason, manufacturers are trying to manufacture small-sized, lightweight battery modules.

Meanwhile, a larger amount of heat is generated from such a high-output, large-capacity secondary battery during charge and discharge of the secondary battery. If heat generated from unit cells of the battery during charge and discharge of the unit cells is not effectively removed from the unit cells, the heat accumulates in the unit cells with the result that deterioration of the unit cells is caused. In addition, if some of the unit cells are overheated due to various causes, the battery may catch fire or explode. For this reason, a cooling system is indispensable for a middle or large-sized battery pack having high output and large capacity The middle or large-sized battery pack is generally cooled by the flow of a coolant. For example, a coolant flow cooling system that performs cooling through the flow of a coolant, such as air, between unit batteries or battery modules of the battery pack using a cooling fan. However, this coolant flow cooling system has several problems.

First, a temperature deviation between unit batteries is very large. The battery pack includes a plurality of unit batteries. In a state in which each of the unit batteries is in an optimal state of operation, the battery pack may also be in an optimal state of operation. Consequently, such a large temperature deviation between the unit batteries may accelerate deterioration of the batteries and make it difficult to optimize the state of operation of the battery pack.

Second, the conventional cooling system causes the increase in size of the battery pack. For example, the large-sized battery pack may not be applicable to electric vehicles (EV) or hybrid electric vehicles (HEV) since the size of the battery pack that can be mounted in the electric vehicles or the hybrid electric vehicles is limited.

Figure 1:
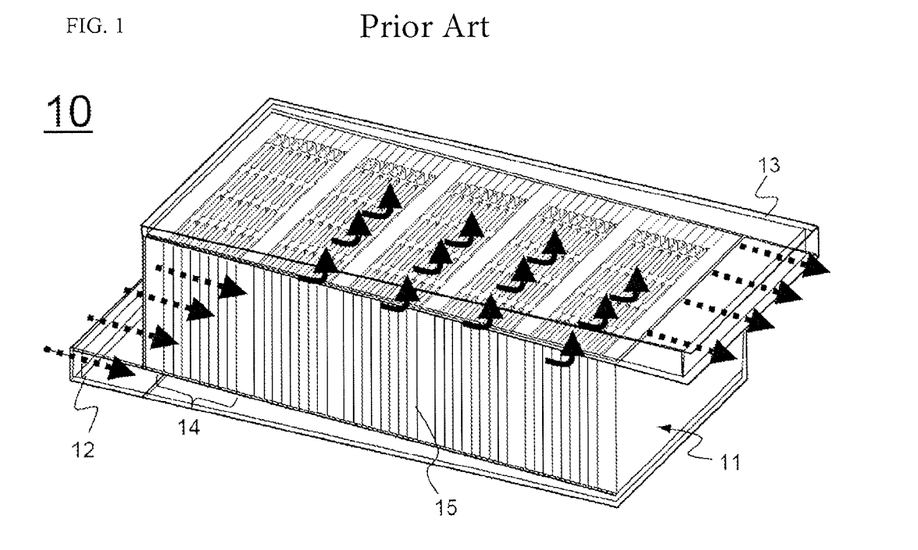
FIG. 1 is a typical view, partially see-through, showing a conventional battery pack cooling system.

FIG. 1 is a typical view showing a conventional representative battery pack cooling system.

A battery pack cooling system 10 includes a battery pack 11 including a plurality of batteries, a coolant introduction part 12 mounted at the lower part of the battery pack 11, and a coolant discharge part 13 mounted at the upper part of the battery pack 11. The battery pack 11 includes a plurality of battery groups 14 electrically connected to each other. Each of the battery groups 14 includes a plurality of unit batteries 15 electrically connected to each other. A small gap, through which a coolant may flow, is formed between the unit batteries 15 of each of the battery groups 14. Consequently, a coolant introduced from the coolant introduction part 12 flows through the gaps. At this time, the coolant removes heat generated by the unit batteries 15. After that, the coolant is discharged through the coolant discharge part 13 mounted at the upper part of the battery pack 11.

In the above structure, the coolant introduction part 12 and the coolant discharge part 13 are provided at the lower part and the upper part of the battery pack 11, respectively. As a result, it is necessary to provide spaces, in which coolant guide members will be mounted, at the lower part and the upper part of the battery pack 11, which further increases the overall size of the battery pack.

Meanwhile, vehicles, such as electric vehicles (EV) or hybrid electric vehicles (HEV), or power storage apparatuses may operate under various conditions. An optimal operation condition of each unit battery constituting a battery pack is generally decided within a specific temperature range although the optimal operation condition of each unit battery may vary due to various causes. Since each unit battery operates in a low temperature state in winter, on the other hand, it is necessary to adjust the battery pack such that the battery pack operates within the optimal operation temperature range. In this case, the cooling system may be stopped, or the temperature of a coolant (e.g. air) introduced into the system may be increased, such that the battery pack is not cooled but the temperature of the battery pack is increased. If the unit batteries are in a very low temperature state, however, components of the batteries may be damaged. In addition, deterioration of the battery pack may be accelerated due to abrupt increase in temperature of the battery pack.

Consequently, there is a high necessity for technology that is capable of fundamentally solving the above problems.

DISCLOSURE

Technical Problem

Therefore, the present invention has been made to solve the above problems, and other technical problems that have yet to be resolved.

As a result of a variety of extensive and intensive studies and experiments to solve the problems as described above, the inventors of the present application have developed a battery module assembly configured to have a structure in which the battery module assembly includes sub-modules arranged in a lateral direction in a state of being spaced apart from each other to provide a coolant flow channel having a specific structure and a module case having a coolant inlet port and a coolant outlet port, and a vertical sectional area of the coolant flow channel decreases toward the coolant outlet port, thereby restraining the increase in volume of the battery module assembly and, at the same time, achieving an improved cooling effect and a uniform cooling effect of the battery module assembly.

Consequently, it is an object of the present invention to provide a battery module assembly configured to have a structure in which battery module assembly can be assembled to have a compact structure, and no additional component for improving cooling efficiency of the battery module is needed, thereby improving efficiency of a production process while providing the compact structure and improving cooling efficiency.

Technical Solution

In accordance with one aspect of the present invention, the above and other objects can be accomplished by the provision of a battery module assembly including unit modules, each of which includes unit cells mounted to a cartridge in a state of being electrically connected to each other via bus bars, the battery module assembly including two or more sub-modules, each of which includes two or more unit modules vertically stacked from a ground to form a coolant flow channel at an interface therebetween, the unit modules being arranged in a lateral direction in a state of being spaced apart from each other to provide the coolant flow channel, and a module case, in which the sub-modules are received and fixed, the module case having a coolant inlet port, through which a coolant is introduced into the module case, and a cool outlet port, through which the coolant is discharged out of the module case, wherein the coolant flow channel is configured to have a structure in which a vertical sectional area of the coolant flow channel decreases toward the coolant outlet port.

In the battery module assembly according to the present invention, the coolant flow channel having the specific structure as described above is provided. Consequently, it is possible to restrain the increase in volume of the battery module assembly and, at the same time, to achieve an improved cooling effect and a uniform cooling effect of the battery module assembly.

In addition, the battery module assembly may be assembled to have a compact structure, and no additional component for improving cooling efficiency of the battery module is needed, thereby improving efficiency of a production process while providing the compact structure.

In addition, the coolant flow channel is configured to have a structure in which the vertical sectional area of the coolant flow channel decreases from the coolant inlet port to the coolant outlet port. Consequently, the sub-modules may be easily received and stably mounted in the module case.

In a concrete example, each of the unit cells may be a plate-shaped battery cell or a battery cell assembly including two or more plate-shaped battery cells mounted in a cell cover in a state in which electrode terminals of the battery cells are exposed.

Each of the battery cells may be a prismatic secondary battery or a pouch-shaped secondary battery.

The prismatic secondary battery may be configured to have a structure in which an electrode assembly is mounted in a prismatic metal case in a sealed state, and the pouch-shaped secondary battery may be configured to have a structure in which an electrode assembly is mounted in a laminate sheet including a resin layer and a metal layer in a sealed state.

Specifically, the secondary battery may be a lithium secondary battery exhibiting high energy density, discharge voltage, and output stability. Other components of the lithium secondary battery will hereinafter be described in detail.

In general, the lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the mixture. A filler may be further added to the mixture as needed. On the other hand, the negative electrode may be manufactured by applying a mixture of a negative electrode active material and a binder to a negative electrode current collector and drying the mixture. The above-mentioned ingredients may be further included as needed.

The separator is disposed between the negative electrode and the positive electrode. The separator may be made of an insulative thin film exhibiting high ion permeability and mechanical strength.

The non-aqueous electrolytic solution containing lithium salt consists of a non-aqueous electrolytic solution and lithium salt. A liquid non-aqueous electrolytic solution, a solid electrolyte, or an inorganic solid electrolyte may be used as the non-aqueous electrolytic solution.

The current collectors, the electrode active materials, the conductive agent, the binder, the filler, the separator, the electrolytic solution, and the lithium salt are well known in the art to which the present invention pertains, and therefore a detailed description thereof will be omitted.

The lithium secondary battery may be manufactured using an ordinary method well known in the art to which the present invention pertains. That is, the lithium secondary battery may be manufactured by disposing a porous separator between a positive electrode and a negative electrode and then injecting an electrolytic solution thereinto.

The positive electrode may be manufactured, for example, by applying a slurry containing a lithium transition metal oxide active material, a conductive agent, and a binder to a current collector and then drying the applied slurry. In the same manner, the negative electrode may be manufactured, for example, by applying a slurry containing a carbon active material, a conductive agent, and a binder to a thin current collector and then drying the applied slurry.

For the battery cell assembly, which is an example of each of the unit cells, the cell cover may include a pair of sheathing members coupled to each other for covering outer surfaces of the battery cells excluding the electrode terminals. For example, two battery cells may be mounted in the cell cover. The two battery cells may be stacked such that the battery cells are connected in parallel to each other in a state in which electrode terminals having the same polarities abut on each other to constitute a battery cell assembly.

In a concrete example, the unit cells of each of the unit modules may be connected in parallel to each other.

Specifically, the unit cells may be mounted to the cartridge such that the electrode terminals face each other, and the electrode terminals may be connected in parallel to each other via bus bars for connection of the battery cells mounted to the cartridge.

The cartridge, which is an electrically insulative member exhibiting predetermined rigidity, protects the unit cells from external impact and ensures stable mounting of the unit cells. In addition, the unit cells are arranges such that the electrode terminals of the unit cells face each other due to the cartridge, whereby electrical parallel connection between the unit cells via the bus bars is more easily achieved.

In a more concrete example, two unit cells may be mounted to each cartridge in a state in which the electrode terminals face each other, and the cartridge may include a first mounting part, to which a first unit cell arranged adjacent to the coolant outlet port is mounted, a second mounting part, to which a second unit cell arranged distant from the coolant outlet port is mounted, and a connection part located between the first mounting part and the second mounting part, the bar bars being mounted to the connection part.

In addition, cartridges located on different sub-modules may be arranged such that a distance between the first mounting parts is less than that between the second mounting parts. In a concrete example, the distance between the first mounting parts may be 20 to 500% that between the second mounting parts.

The sub-modules having the above-described structure form a coolant flow channel configured to have a structure in which the vertical section area of the coolant flow channel decreases toward the coolant outlet port. Specifically, the a coolant flow channel having the above-described structure is wide at the front part of the battery module assembly, and is narrow at the rear part of the battery module assembly adjacent to the coolant outlet port. Consequently, it is possible to reduce the temperature deviation between the first unit cell mounted to the first mounting part adjacent to the coolant outlet port and the second unit cell mounted to the second mounting part distant from the coolant outlet port. As a result, it is possible to reduce the temperature deviation among all of the battery cells constituting the battery module assembly, thereby achieving an improved cooling effect and a uniform cooling effect.

In another concrete example, each cartridge may be provided at opposite sides thereof with protrusions each having a fastening hole, and the cartridges be coupled to each other using fastening members inserted through the fastening holes to constitute the sub-modules. Consequently, the unit cells may be fixed by the cartridge and, at the same time, the cartridges may be fastened to each other by coupling through the fastening holes. Consequently, it is possible to achieve a more secure and stable fixing effect. The cartridges may be fastened to each other, for example, by inserting bolts through the fastening holes. However, the present invention is not limited thereto.

In a concrete example, one end of a surface of each of the bus bars for connection of the unit cells, to which a corresponding one of the electrode terminals is coupled, may be bent upward or downward, and the bent end may be connected to a connection member such that adjacent unit modules are electrically connected to each other.

In addition, the unit modules of each of the sub-modules may be connected in series or in parallel to each other. For example, the unit modules may be stacked differently while the connection members are mounted on the same position to provide a parallel connection structure.

In a concrete example, the module case may be provided at portions thereof perpendicular to the coolant outlet port with two or more coolant inlet ports arranged with respect to the coolant flow channel, and the coolant inlet ports may be formed at opposite portions of the module case symmetrically with respect to the coolant flow channel.

Consequently, the coolant is introduced through the coolant inlet ports formed at the side of the battery module assembly to remove heat from the battery cells, is introduced into the coolant flow channel between the sub-modules, and is then discharged through the coolant outlet port formed at the rear of the battery module assembly. That is, the coolant generally flows in the shape of T when viewed above.

According to circumstances, a fan or a discharge duct may be mounted at the coolant outlet port in order to further improve the cooling effect.

In accordance with another aspect of the present invention, there is provided a device including the battery module assembly with the above-stated construction as a power source. Specifically, the device may be an electric vehicle, a hybrid electric vehicle, a plug-in hybrid electric vehicle, a power storage apparatus, a power supply for emergency, a power supply for computer rooms, a portable power supply, a power supply for medical facilities, a power supply for fire extinguishing facilities, a power supply for alarm facilities, or a power supply for refuge facilities. However, the present invention is not limited thereto.

The structure and manufacturing method of the device are well known in the art to which the present invention pertains and thus a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 2:
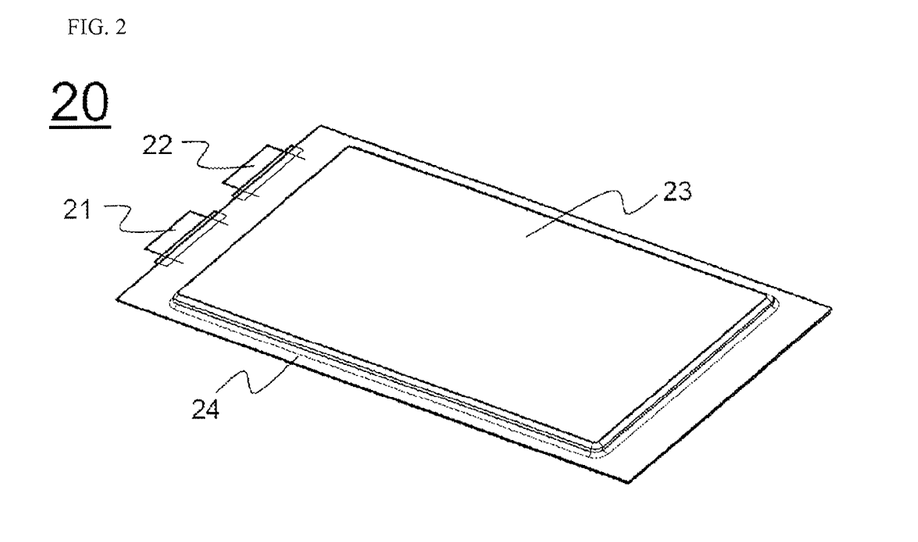
FIG. 2 is a perspective view showing a pouch-shaped battery cell according to the present invention.

FIG. 2 is a perspective view showing a pouch-shaped battery cell according to the present invention.

Referring to FIG. 2, a battery cell 20 is a plate-shaped battery cell 20 having electrode terminals (a positive electrode terminal 21 and a negative electrode terminal 22) formed at one end thereof. Specifically, the plate-shaped battery cell 20 is configured to have a structure in which an electrode assembly (not shown) is mounted in a pouch-shaped case 23 made of a laminate sheet including a metal layer (not shown) and a resin layer (not shown), and a sealed portion 24 is formed at the pouch-shaped case 23, for example, by thermal bonding. The plate-shaped battery cell may also be referred to as a "pouch-shaped battery cell."

Figure 3:
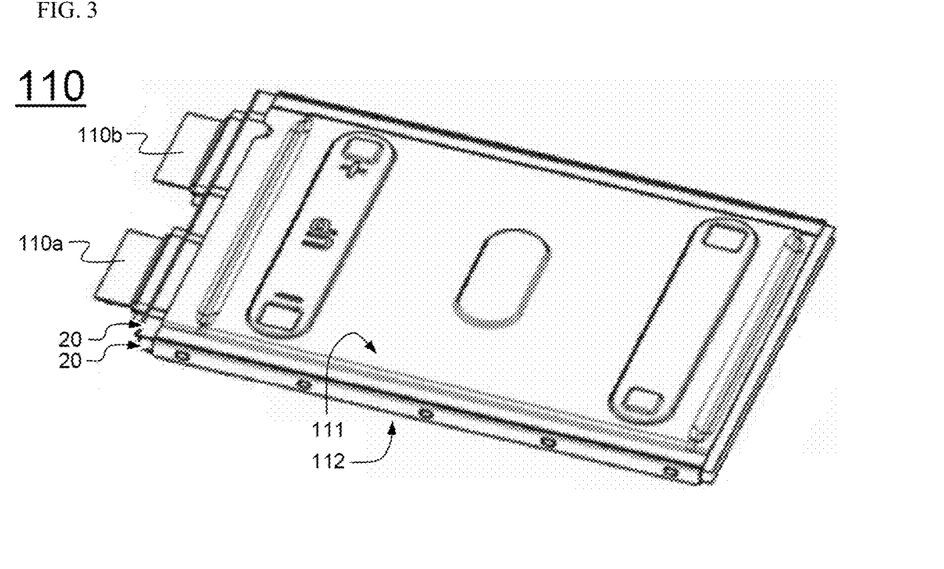
FIG. 3 is a perspective view showing a unit cell configured to have a structure in which battery cells, one of which is shown in FIG. 2, are mounted in a cell cover.

FIG. 3 is a perspective view showing a unit cell (battery cell assembly) configured to have a structure in which battery cells, one of which is shown in FIG. 2, are mounted in a cell cover.

Referring to FIG. 3 together with FIG. 2, two battery cells 20 are received and fixed in a cell cover 111 and 112 including an upper cell cover 111 and a lower cell cover 112. Electrode terminals 21 and 22 of the battery cells 20 are exposed from one side of the cell cover such that the electrode terminals 21 and 22 of the battery cells 20 are electrically connected in parallel to each other to constitute two electrode terminals 110a and 110b of the unit cell.

Figure 4:
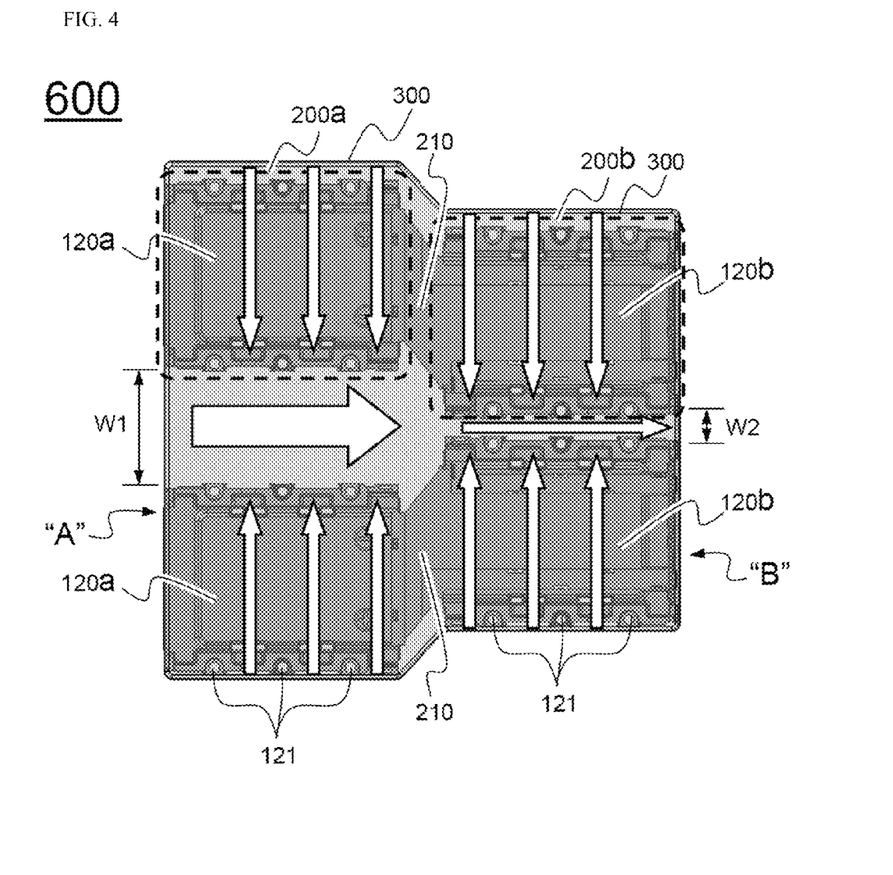
FIG. 4 is a plan view showing a battery module assembly according to the present invention.
Figure 5:
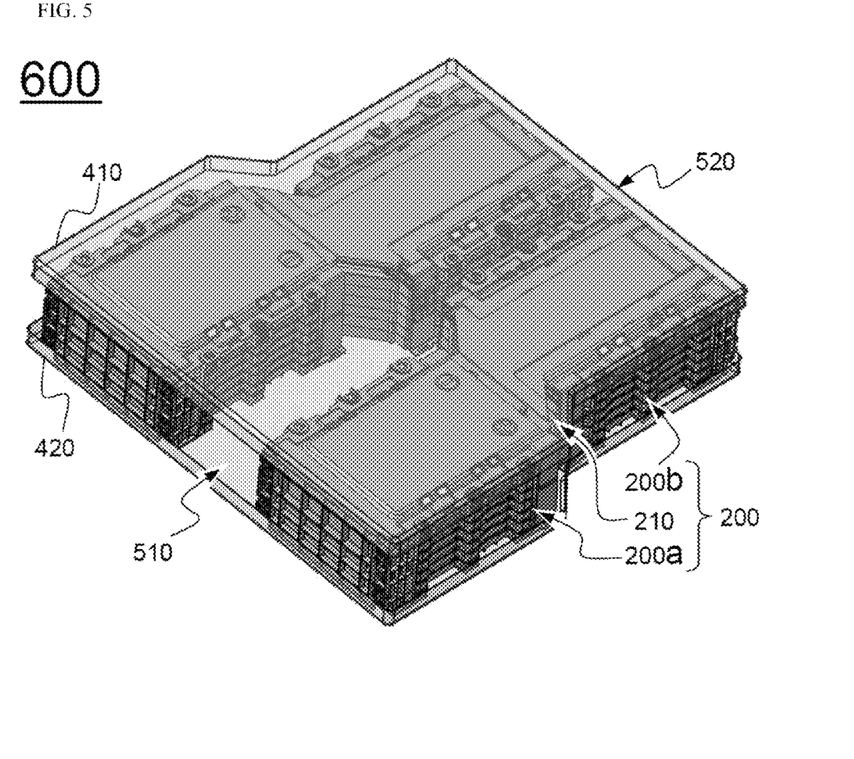
FIG. 5 is a perspective view showing the battery module assembly according to the present invention.
Figure 6:
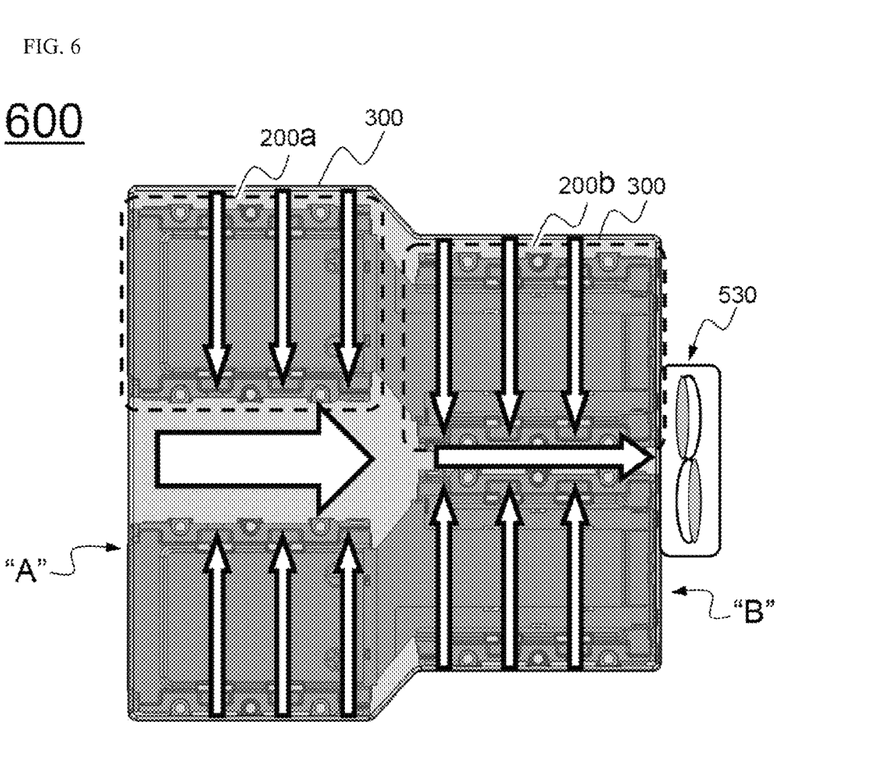
FIG. 6 is a plan view showing a battery module assembly according to another embodiment of the present invention.

FIGS. 4 and 5 are a plan view and a perspective view showing a battery module assembly according to the present invention, respectively. In addition, FIG. 6 is a plan view showing a battery module assembly according to another embodiment of the present invention.

Referring to these figures, two unit cells 110 are mounted to cartridges 120a and 120b to constitute a unit module, and a plurality of unit modules is vertically stacked to constitute a sub module 200. The unit cells 110 are arranged such that the positive electrode terminals 110a and the negative electrode terminals 110b of the unit cells 110 face each other. In addition, the electrode terminals 110a and 110b are electrically connected in parallel to each other via bus bars (not shown) included in connection parts 210.

In addition, each of the cartridges 120a and 120b includes a first mounting part 120b, in which a first unit cell (not shown) is mounted, a second mounting part 120a, in which a second unit cell (not shown) is mounted, and a connection part 210, located between the first mounting part 120b and the second mounting part 120a, at which a bus bar (not shown) is mounted.

Meanwhile, a distance W2 between the first mounting parts is 20 to 500% a distance W1 between the second mounting parts. Consequently, a coolant flow channel (see horizontal arrows) formed by the sub-modules 200 is configured to have a structure in which a vertical sectional area of the coolant flow channel decreases from a side A of an opposite end of a coolant outlet port 520 to a side B of the coolant output port 520.

Coolant inlet ports (not shown) are formed in a side 300 of a module case such that a coolant is introduced from sides of the sub-modules (see vertical arrows). The module case 300, 410, and 420 includes an upper cover plate 410 and a lower base plate 420 such that the coolant introduced into the module case 300, 410, and 420 is prevented from being discharged in directions other than the coolant outlet port 520.

Consequently, the coolant is introduced through the coolant inlet ports formed at a side 300 of a battery module assembly 600 to remove heat from the battery cells (not shown) mounted in the sub-modules 200, is introduced into the coolant flow channel (see the horizontal arrows) between the sub-modules 200, and is then discharged through the coolant outlet port 520 formed at the rear B of the battery module assembly 600. That is, the coolant generally flows in the shape of T when viewed above.

According to circumstances, as shown in FIG. 6, a fan 530 or a discharge duct (not shown) may be further mounted at the coolant outlet port 520 formed at the rear B of the battery module assembly 600 in order to further improve a cooling effect.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module assembly according to the present invention is configured to have a structure in which the battery module assembly includes sub-modules arranged in a lateral direction in a state of being spaced apart from each other to provide a coolant flow channel having a specific structure and a module case having a coolant inlet port and a coolant outlet port, and a vertical sectional area of the coolant flow channel decreases toward the coolant outlet port, thereby restraining the increase in volume of the battery module assembly and, at the same time, achieving an improved cooling effect and a uniform cooling effect of the battery module assembly. In addition, the battery module assembly is assembled to have a compact structure, and no additional component for improving cooling efficiency of the battery module is needed, thereby improving efficiency of a production process while providing the compact structure.

The invention claimed is:

1. A battery module assembly, comprising:
a plurality of unit modules comprising a plurality of unit cells and a plurality of cartridges, wherein each unit module comprises two unit cells, each mounted to a cartridge, and wherein unit cells are electrically connected to each other via bus bars mounted to the cartridges;
two or more sub-modules, each of which comprises two or more unit modules vertically stacked from a ground to form a coolant flow channel at an interface therebetween, the unit modules being arranged in a lateral direction in a state of being spaced apart from each other to provide the coolant flow channel; and a module case, in which the sub-modules are received and fixed, the module case having a coolant inlet port, through which a coolant is introduced into the module case, and a cool outlet port, through which the coolant is discharged out of the module case, wherein the coolant flow channel is configured to have a structure in which a vertical sectional area of the coolant flow channel decreases toward the coolant outlet port, wherein each of the unit cells is a plate-shaped battery cell or a battery cell assembly comprising two or more plate-shaped battery cells mounted in a cell cover in a state in which electrode terminals of the battery cells are exposed, wherein the electrode terminals are connected in parallel to each other via said bus bars, and wherein in each unit module, the two unit cells are mounted to cartridges such that the electrode terminals face each other.

2. The battery module assembly according to claim 1, wherein each of the battery cells is a prismatic secondary battery or a pouch-shaped secondary battery.

3. The battery module assembly according to claim 2, wherein the pouch-shaped secondary battery is configured to have a structure in which an electrode assembly is mounted in a laminate sheet comprising a resin layer and a metal layer in a sealed state.

4. The battery module assembly according to claim 1, wherein the cell cover comprises a pair of sheathing members coupled to each other for covering outer surfaces of the battery cells excluding the electrode terminals.

5. The battery module assembly according to claim 1, wherein the unit cells of each of the unit modules are connected in parallel to each other.

6. The battery module assembly according to claim 1, wherein each cartridge comprises a first mounting part, to which a first unit cell arranged adjacent to the coolant outlet port is mounted, a second mounting part, to which a second unit cell arranged distant from the coolant outlet port is mounted, and a connection part located between the first mounting part and the second mounting part, the bar bars being mounted to the connection part.

7. The battery module assembly according to claim 6, wherein cartridges located on different sub-modules are arranged such that a distance between the first mounting part is less than that between the second mounting part.

8. The battery module assembly according to claim 6, wherein the distance between the first mounting part is 20 to 500% that between the second mounting part.

9. The battery module assembly according to claim 1, wherein each unit module is provided at opposite sides thereof with protrusions, each having a fastening hole, and the unit modules are coupled to each other using fastening members inserted through the fastening holes to constitute the sub-modules.

10. The battery module assembly according to claim 1, wherein the unit modules of each of the sub-modules are connected in series to each other.

11. The battery module assembly according to claim 1, wherein one end of a surface of each of the bus bars, to which a corresponding one of the electrode terminals is coupled, is bent upward or downward, and the bent end is connected to a series connection member such that adjacent unit modules are connected in series to each other.

12. The battery module assembly according to claim 1, wherein the module case is provided at portions thereof perpendicular to the coolant outlet port with two or more coolant inlet ports arranged with respect to the coolant flow channel.

13. The battery module assembly according to claim 12, wherein the coolant inlet ports are formed at opposite portions of the module case symmetrically with respect to the coolant flow channel.

14. The battery module assembly according to claim 1, wherein a fan or a discharge duct is mounted at the coolant outlet port of the battery module assembly.

15. A device comprising a battery module assembly according to claim 1 as a power source.

16. The battery module assembly according to claim 15, wherein the device is an electric vehicle, a hybrid electric vehicle, a plug-in hybrid electric vehicle, a power storage apparatus, a power supply for emergency, a power supply for computer rooms, a portable power supply, a power supply for medical facilities, a power supply for fire extinguishing facilities, a power supply for alarm facilities, or a power supply for refuge facilities.

* * * * *